US 011247649B2

(12) United States Patent
Eckert (10) Patent No.: US 11,247,649 B2
(45) Date of Patent: Feb. 15, 2022

(54) METHOD FOR DECELERATING A VEHICLE COMBINATION AND COMBINATION OF PNEUMATIC BRAKE SYSTEMS OF THE VEHICLES OF A VEHICLE COMBINATION

(71) Applicant: WABCO Europe BVBA, Brussels (BE)

(72) Inventor: Horst Eckert, Rehburg-Loccum (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 536 days.

(21) Appl. No.: 16/338,499

(22) PCT Filed: Oct. 23, 2017

(86) PCT No.: PCT/EP2017/001241
§ 371 (c)(1),
(2) Date: Apr. 1, 2019

(87) PCT Pub. No.: WO2018/077470
PCT Pub. Date: May 3, 2018

(65) Prior Publication Data
US 2021/0370898 A1  Dec. 2, 2021

(30) Foreign Application Priority Data

Oct. 27, 2016 (DE) ..................... 10 2016 012 925.5

(51) Int. Cl.
*B60T 7/12* (2006.01)
*B60T 8/1766* (2006.01)
(Continued)

(52) U.S. Cl.
CPC ............ *B60T 8/1766* (2013.01); *B60T 8/171* (2013.01); *B60T 8/17616* (2013.01);
(Continued)

(58) Field of Classification Search
CPC .... B60T 8/1766; B60T 8/171; B60T 8/17616; B60T 8/321; B60T 13/683; B60T 17/221;
(Continued)

(56) References Cited

U.S. PATENT DOCUMENTS 4,585,278 A * 4/1986 Grauel ................. B60T 8/1708
303/118.1
5,984,433 A * 11/1999 Stumpe ................... B60T 7/042
303/113.4
(Continued)

FOREIGN PATENT DOCUMENTS

DE  10261513 A1  7/2004
EP  0146769 A2  7/1985
(Continued)

*Primary Examiner* — Shardul D Patel
(74) *Attorney, Agent, or Firm* — Leydig, Voit & Mayer, Ltd.

(57) ABSTRACT

A method for decelerating a vehicle combination including a towing vehicle having a towing vehicle brake system and at least one trailer vehicle having a trailer brake system with an anti-lock brake system includes applying, by the towing vehicle brake system, a brake pressure to pneumatically operable wheel brakes of the towing vehicle according to a desired deceleration specified by a driver, and providing, by the towing vehicle brake system, a trailer brake pressure for the trailer brake system of the at least one trailer vehicle. An electronic brake control unit of the towing vehicle brake system: detects a current actual vehicle deceleration value continuously compares the current actual vehicle deceleration actual value with a maximum deceleration, and, when the current actual vehicle deceleration value reaches or exceeds the maximum deceleration, limits the brake pressure and provides an information signal.

8 Claims, 2 Drawing Sheets

(51) Int. Cl.
*B60T 8/32* (2006.01)
*B60T 13/68* (2006.01)
*B60T 8/171* (2006.01)
*B60T 8/1761* (2006.01)
*B60T 17/22* (2006.01)

(52) U.S. Cl.
CPC ............ *B60T 8/321* (2013.01); *B60T 13/683* (2013.01); *B60T 17/221* (2013.01); *B60T 2240/00* (2013.01); *B60T 2250/00* (2013.01); *B60T 2270/10* (2013.01); *B60T 2270/88* (2013.01)

(58) Field of Classification Search
CPC ............ B60T 2240/00; B60T 2250/00; B60T 2270/10; B60T 2270/88; B60T 7/12
USPC .......................................................... 701/78
See application file for complete search history.

(56) References Cited

U.S. PATENT DOCUMENTS

| | | | |
|---|---|---|---|
| 7,134,733 B2 | 11/2006 | Eckert et al. | |
| 8,855,716 B2* | 10/2014 | Marett | G08B 25/003 455/558 |
| 2005/0017577 A1* | 1/2005 | Eckert | B60T 13/683 303/123 |
| 2014/0200786 A1* | 7/2014 | Morselli | B60T 8/1708 701/74 |
| 2018/0354478 A1* | 12/2018 | Eckert | B60T 8/1701 |

FOREIGN PATENT DOCUMENTS

| | | |
|---|---|---|
| EP | 3009312 A1 | 4/2016 |
| WO | WO 2010010319 A2 | 1/2010 |
| WO | WO 2013004314 A1 | 1/2013 |

* cited by examiner

METHOD FOR DECELERATING A VEHICLE COMBINATION AND COMBINATION OF PNEUMATIC BRAKE SYSTEMS OF THE VEHICLES OF A VEHICLE COMBINATION

CROSS REFERENCE TO RELATED APPLICATIONS

This application is a U.S. National Stage Application under 35 U.S.C. § 371 of International Application No. PCT/EP2017/001241 filed on Oct. 23, 2017, and claims benefit to German Patent Application No. DE 10 2016 012 925.5 filed on Oct. 27, 2016. The International Application was published in German on May 3, 2018 as WO 2018/077470 A1 under PCT Article 21(2).

FIELD

The invention relates to methods for decelerating a vehicle combination with a towing vehicle and at least one trailer vehicle with an anti-lock brake system, to combinations of pneumatic brake systems of a towing vehicle and a trailer vehicle, and to a vehicle combination with an electronic towing vehicle brake system of a towing vehicle of the vehicle combination and at least one trailer brake system of a trailer vehicle with an anti-lock brake system.

BACKGROUND

In commercial vehicles the wheels are braked by means of pneumatically operable wheel brakes as a rule, wherein each sub vehicle of a vehicle combination comprises a brake system. In this case, the towing vehicle brake system determines the brake pressure for the wheel brakes of the towing vehicle and moreover provides a trailer brake pressure for the trailer brake system. In this case, the trailer brake pressure is as a rule provided via a coupling head to which the brake circuit of a trailer vehicle can be connected.

SUMMARY

In an embodiment, the present invention provides a method for decelerating a vehicle combination including a towing vehicle having a towing vehicle brake system and at least one trailer vehicle having a trailer brake system with an anti-lock brake system. The method includes applying, by the towing vehicle brake system, a brake pressure to pneumatically operable wheel brakes of the towing vehicle according to a desired deceleration specified by a driver, and providing, by the towing vehicle brake system, a trailer brake pressure for the trailer brake system of the at least one trailer vehicle. An electronic brake control unit of the towing vehicle brake system: detects a current actual vehicle deceleration value continuously compares the current actual vehicle deceleration actual value with a maximum deceleration, and, when the current actual vehicle deceleration value reaches or exceeds the maximum deceleration, limits the brake pressure and provides an information signal for respective brake electronics of the at least one trailer vehicle that represents at least one item of limiting status information. The respective brake electronics of the trailer brake system of the at least one trailer vehicle: detects measurement signals of revolution rate sensors of wheels of the trailer vehicle, applies the trailer brake pressure to the wheel brakes of the trailer vehicle depending on the measurement signals by actuating pressure control valves, receives the information signal, and, upon detecting limiting of the brake pressure P in the towing vehicle, determines for each trailer axle a dynamic slip variable value representing a slip using the detected measurement signals, and compares slip variable values of all trailer axles with each other and closes inlet valves of respective pressure control valves at least at those trailer axles which have the higher slips compared to a control axle with a currently smallest slip.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention applies to trailer vehicles with anti-lock brake systems. Such brake systems monitor the tendency to locking of the wheels. I.e., during each braking only a brake force corresponding to the coefficient of friction of the road can be used. If the controlled brake force exceeds the maximum transferable brake force on one or more wheels because of the applied brake pressure, these wheels start to lock, whereby the vehicle can become unstable. The anti-lock brake system permanently monitors the rotational behavior of each wheel or each axle by means of measurement signals of revolution rate sensors. For example, a respective wheel slip can be determined by comparing the wheel speed determined from the wheel revolution rate with a calculated or determined vehicle reference speed. If a tendency to locking of the wheel is detected from the wheel slip that is determined in this way, i.e. an ABS slip limit is reached or exceeded, brake electronics of the brake system influence the brake pressure at the relevant wheels by actuating pressure control valves. Modern pressure control valves, also known as ABS valves, consist of an inlet valve and an outlet valve, so that the brake pressure can be increased, maintained or reduced as required. After detection of a locking tendency, in a first step, the brake pressure is reduced, in order to then control the brake pressure of the relevant wheel along the slip limit.

Commercial vehicles with anti-lock brake systems very often comprise a braking capability that is too great, especially when the load is light. In particular, with vehicle combinations with differently loaded sub vehicles there is a high probability that overbraking of individual axles will occur. Taking the load state into account is carried out in case of an automatic load-dependent brake (ALB), by which brake systems of a commercial vehicle are understood in which the brake pressure to achieve a certain braking effect on a wheel or an axle is made dependent on the load state. For a heavy load the brake pressure is increased and for a lighter load the brake pressure is reduced in order to adapt the braking effect of the wheel or the axle to the desired deceleration demanded by the driver, also the risk of premature locking of one or more wheels should be minimized.

It is known in this case to detect the load state by means of a connection to the suspension of the commercial vehicle or in other known systems by analyzing the wheel slip.

However, a number of commercial vehicles, especially trailer vehicles, are not fitted with ALB, especially commercial vehicles outside Europe. During braking by the driver, very often a highly excessive deceleration in relation to the degree of operation of the brake pedal by the driver is caused by the brake systems. A similar behavior can also occur with so-called unladen vehicles, in which the brake system has not been adapted to a smaller mass of the vehicle. This applies for example to a vehicle that is relatively light within a vehicle series with identical brake systems. In vehicles without automatic load-dependent brakes (ALB) individual axles overbrake or underbrake, depending on the axle load distribution within the vehicle. This phenomenon is even more pronounced in vehicle combinations with a plurality of commercial vehicles.

Embodiments of the invention improve the braking behavior of a vehicle combination of a towing vehicle and at least one trailer vehicle with an anti-lock brake system.

In the following description, a towing vehicle means a leading sub vehicle in the vehicle combination that tows a trailer vehicle directly or indirectly by means of a further trailer vehicle. According to embodiments of the invention, the towing vehicle brake system comprises an electronic brake control unit that detects a current vehicle deceleration actual value and continuously compares it with a determined or specified maximum deceleration. In the case in which the vehicle deceleration actual value reaches or exceeds the maximum deceleration, the brake control unit limits the brake pressure in the towing vehicle. This is carried out in particular by closing the inlet valves of the pressure control valves for the duration of the limiting of the brake pressure, so that a further rise in the brake pressure is excluded. At the same time, in the case of limiting the brake pressure the brake control unit provides the towing vehicle brake system with an information signal for the respective brake electronics of each trailer vehicle that represents limiting status information.

The respective brake electronics of a trailer brake system receives the information signal of the towing vehicle and, on detecting limiting of the brake pressure in the towing vehicle, determines a dynamic slip variable value representing the slip using the measurement signals of revolution rate sensors of the wheels of the relevant trailer vehicle for each trailer axle. In this case, the respective slip of the trailer axle or particularly advantageously the respective speed of the trailer axle is determined as the slip variable value. In this case, different speeds of the trailer axles accompany each different slip, wherein a higher axle speed enables a lower slip on the relevant axle to be concluded.

The brake electronics of the trailer vehicle compares the slip variable values of all the trailer axles with each other and shuts off the inlet valves of the respective pressure control valves at least at those trailer axles which have the higher slips compared to a trailer axle that is selected as a control axle with the currently smallest slip. In other words, the trailer axle having the highest speed, which accordingly has the currently smallest slip of all the compared trailer axles, is selected as the control axle and in any case the respective inlet valves on all other trailer axles are closed so that an increase in the trailer brake pressure would be effective only on the wheel brakes of the control axle. As the slip variable values of the trailer axles are continuously being compared with each other and the selection of the control axle on which the inlet valve can remain open may be changed in the presence of corresponding brake conditions, slip differences of the trailer axles are being compensated similarly to a slip difference control, and overbraking or underbraking of individual trailer axles is counteracted.

In an advantageous embodiment of the invention, the maximum deceleration is determined as a function of the desired deceleration specified by the driver. In this case the maximum deceleration is determined on the one hand such that in the lower region (starting region) of the desired deceleration the profile of the maximum deceleration has a smaller slope than the profile of the desired deceleration and in the further profile the desired deceleration is increasingly steeper with increasing desired acceleration. On the other hand, when determining the maximum deceleration a quasi-unnecessary or unwanted braking effect by the vehicle axles of the towing vehicle is avoided by limiting the brake pressure of those towing vehicle axles to a value that is required to decelerate the towing vehicle according to the desired maximum deceleration specified by the driver. In order to guarantee a safe braking agreeable to the driver even for different load states, the maximum deceleration is specified depending on the desired deceleration and the load. Therefore, the maximum deceleration characteristic curve has a relatively flatter profile for a large load and a relatively steeper profile for a smaller load, i.e. it increases more sharply on average, so that the brake pressure on the wheel brakes of the towing vehicle axles to be controlled is already maintained at a lower vehicle deceleration actual value for a greater load than for a smaller load.

To determine the maximum deceleration, a characteristic field memory is advantageously associated with the brake control unit of the towing vehicle, in which maximum decelerations to be specified depending on the desired deceleration are stored. The brake control unit is accordingly designed to determine a maximum deceleration as a function of the desired deceleration that is currently specified by the driver. By taking into account maximum deceleration characteristic curves when determining the maximum deceleration, the driver is notified of the load state of the vehicle by the controlled braking effect, because at a smaller load deceleration is greater for the same desired deceleration than for a large load. Not least because of this effect, the maximum deceleration characteristic curves can also be referred to as "feeling curves". The feeling curve deceleration is always dependent on the driver's braking demand, i.e. on the magnitude of the desired deceleration that is specified by the driver (by operating a brake pedal). The feeling curves or maximum deceleration characteristic curves are dependent on a determined mass of the vehicle or axle loads in further advantageous embodiments. Different feeling curves can be used depending on the driving or braking situation.

The information signal of the electronic brake control unit is in particular transmitted by means of a data transmission between the towing vehicle and the trailer vehicle, for example over a CAN bus.

In a particularly advantageous embodiment of the invention, the dynamic slip variable value of the control axle of the trailer vehicle is compared with corresponding slip variable values of the axles of the towing vehicle, so that underbraking or overbraking of the control axle of the trailer vehicle can be reliably detected. The brake control unit of the towing vehicle determines information about the dynamic slip variable values of the axles of the trailer vehicle from the measurement signals of revolution rate sensors on the wheels of the towing vehicle. The corresponding information is typically already available from the brake management functions and stability functions implemented in the brake control unit of the towing vehicle, for example from an anti-lock brake system of the towing vehicle brake system.

If exceeding the specified maximum deceleration were to be detected with the actual value of the vehicle deceleration of the vehicle combination that comprises a plurality of sub vehicles, then a conclusion can be drawn regarding the influence of the trailer vehicle on the overbraking of the entire vehicle combination by comparing the dynamic slip variable values of axles of different vehicles. In the case in which the control axle of the trailer vehicle has the greatest slip compared to the towing vehicle axles, it can be detected that the trailer vehicle is largely responsible for the vehicle combination overbraking or exceeding the specified maximum deceleration. In this case, the inlet valves of the pressure control valves on the control axle are also closed, so that a further rise in the brake pressure is excluded on all the trailer axles. By the continuous determination and comparison of the slip variable values it is ensured that a reassessment of the braking situation is carried out in the event of a change in the braking distribution on the axles, for example in the event of a change in the desired deceleration that is demanded by the driver according to his brake pedal operation.

Data transfer between the towing vehicle and the trailer vehicle becomes minimal if the brake electronics of the trailer vehicle communicates the slip variable value of the trailer axle it has determined as the control axle to the brake control unit of the towing vehicle. The comparison of the dynamic slip variable values of the control axle of the trailer vehicle with the corresponding slip variable values of the axles of the towing vehicle is carried out by the brake control unit in this case, which provides an information signal with overbraking information corresponding to the comparison of the slip variable values. In this case, the overbraking information indicates the contribution of the axles of the trailer vehicle to the overbraking of the entire vehicle combination.

The overbraking information has the contents "1", i.e. a first overbraking status, if the slip of the control axle of the trailer vehicle, which has been communicated to the brake control unit of the towing vehicle, is smaller than the slip of at least one of the towing vehicle axles. For the advantageous analysis and comparison of the axle speeds, this corresponds to a higher axle speed of the control axle compared to at least one of the towing vehicle axles. If the axle speed of the control axle is less than the speeds of all the towing vehicle axles that are being considered, i.e. the slip thereof is greater than that of all the towing vehicle axles that are being considered, then the brake control unit of the towing vehicle provides the brake electronics of the trailer vehicle with the overbraking information with the overbraking status "2". If the brake electronics of the trailer brake system receive an information signal with the overbraking information according to the overbraking status "1", then the inlet valves of the respective pressure control valves are closed on all trailer axles with the exception of the trailer axle with the currently smallest slip (control axle). If the brake electronics of the trailer brake system receive overbraking information with the overbraking status "2", then the respective inlet valves are closed on all wheel brakes of the trailer vehicle until this situation changes.

An information signal with overbraking information, either with the overbraking status "1" or the overbraking status "2", also represents the exchange of limiting status information. In braking situations in which the current vehicle deceleration actual value does neither reach nor exceed the maximum deceleration, no information signal is transferred or an information signal with braking status information with the overbraking status "0" is transferred. Therefore only a very small amount of data has to be transferred from the brake control unit of the towing vehicle to the brake electronics of the trailer vehicle in order to provide the necessary information to the brake electronics of the trailer vehicle for carrying out a method according to an embodiment of the invention.

Figure 1:
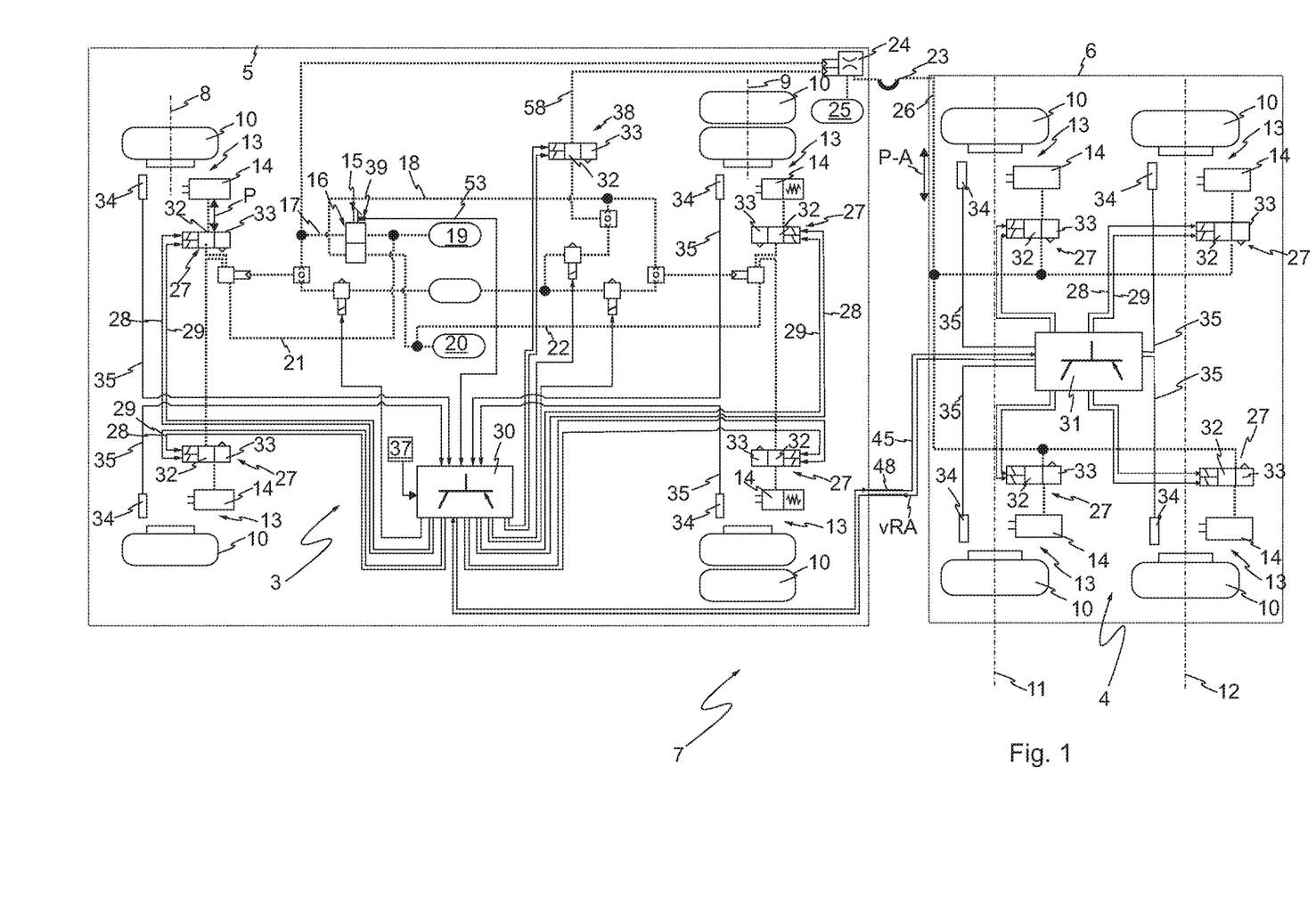
FIG. 1 shows a pneumatic and electrical schema of an exemplary embodiment of a combination of brake systems of a vehicle combination.

FIG. 1 shows an electrical-pneumatic plan for a combination of pneumatic brake systems 3, 4 of the commercial vehicles 5, 6 of a vehicle combination 7, namely a towing vehicle 5 with one trailer vehicle 6 in the exemplary embodiment. Electrical lines are represented with solid lines and pneumatic lines with dotted lines. In the exemplary embodiment shown the towing vehicle 5 comprises two axles, namely a front axle 8 and a rear axle 9, on each of which wheels 10 are disposed on both sides. The trailer vehicle 6 also comprises two trailer axles 11, 12, each with wheels 10. For braking the wheels 10, a wheel brake 13 that can be operated pneumatically by means of brake cylinders 14 is associated with each wheel 10. The wheel brakes 13 exert a brake force on the rotating wheel 10 according to the respective pneumatic brake pressure P applied in the brake cylinder 14.

In the driver's cab of the towing vehicle 5 there is a brake pedal 15 that is coupled to a service brake valve 16. The driver of the towing vehicle 5 can switch pneumatic pressure through to the brake cylinders 14 by operating the brake pedal 15 and can thereby operate the wheel brakes 13. For this purpose, the service brake valve 16 controls pneumatic brake lines 17, 18 between pressure medium reservoirs 19, 20 and the brake cylinders 14.

In the exemplary embodiment shown, the wheel brakes 13 of the front axle 8 are associated with a common first brake circuit 21, whereas the wheel brakes 13 of the rear axle 9 can be operated by means of a second brake circuit 22. In this case the first pressure medium reservoir 19 is associated with the first brake circuit 21 and is connected via the brake line 17 to the brake cylinders 14 of the front axle 8. The second brake circuit 22 of the rear axle 9 is supplied with pressure medium by means of a second pressure medium reservoir 20. The second brake circuit 22 is designed similarly to the first brake circuit 21, i.e. in that the brake line 18 between the second pressure medium reservoir 20 to the wheel brakes 13 of the rear axle 9 can be enabled by means of the service brake valve 16 and therefore the brake pressure P can be adjusted as a function of the brake pedal 15 position.

The towing vehicle brake system 3 comprises a coupling head 23 to which the trailer brake system 4 of the trailer vehicle 6 can be coupled. The towing vehicle brake system 3 provides a pneumatic trailer brake pressure P-A for the trailer brake system 4 by means of the coupling head 23. In this case, a trailer coupling valve 24 that controls the connection between a third pressure reservoir 25 and the pneumatic coupling head 23 is associated with the coupling head 23. The trailer brake system 4 comprises a trailer brake circuit 26 in which the trailer brake pressure P-A provided by the towing vehicle 5 prevails and can be switched through to all the wheel brakes 13.

An electrically actuatable pressure control valve 27 is connected upstream of each brake cylinder 14 both in the towing vehicle brake system 3 and in the trailer brake system 4. The pressure control valves 27 of the towing vehicle brake system 3 are connected to a brake control unit 30 to receive control signals 28, 29. The pressure control valves 27 of the trailer brake system 4 are connected to a brake electronics 31. The pressure control valves 27 are each a combination of at least two solenoid valves, namely an inlet valve 32 and an outlet valve 33. In principle the inlet valve 32 is used in this case to increase the pressure or to maintain the pressure in the respective brake cylinder 14, whereas the outlet valve 33 is opened to reduce the brake pressure and vents the respective connected brake cylinder 14. The inlet valve 32 and the outlet valve 33 are preferably 2/2-way valves.

The brake control unit 30 and the brake electronics 31 are designed and provided to influence the brake pressure in the respective vehicle as required. For this purpose, the rotational behavior of the wheels 10 is monitored in each vehicle. A revolution rate sensor 34 is associated with each wheel 10 of the towing vehicle 5 and each wheel 10 of the trailer vehicle 6 in this case and produces measurement signals 35 with information about the rotational behavior of the respective wheel 10. The revolution rate sensors 34 of the towing vehicle brake system 3 are connected to the brake control unit 30 and the revolution rate sensors 34 of the trailer brake system 4 are connected to the brake electronics 31. The brake control unit 30 analyses the measurement signals 35 of the revolution rate sensors 34 of the towing vehicle brake system 3.

The brake electronics 31, the revolution rate sensors 34 and the pressure control valves 27 of the trailer brake system 4 are the essential elements of an anti-lock brake system (reference character 36 in FIG. 2) of the trailer vehicle 6. The brake electronics 31 monitors the tendency to locking of the individual wheels by means of the revolution rate sensors 34 or by analysis of the measurement signals 35 thereof. On detecting a tendency to locking of an individual wheel, the brake electronics 31 counteracts a locking of the wheels by actuating one or more pressure control valves 27 and controlling the brake pressures along the slip limit.

The analysis of the measurement signals 35 of the revolution rate sensors 34 is carried out for one or more brake management functions or stability functions, such as an anti-lock function for example. Moreover, the brake control unit 30 receives driver's command information 53, from which the brake control unit 30 derives the desired deceleration demanded by the driver (reference character "z-Soll" in FIG. 2). A brake signal transmitter 39 is provided for this purpose in the exemplary embodiment shown, which for example is coupled to a component of the service brake valve 16 or to the brake pedal 15 in the driver's cab for a distance measurement or force measurement. In a further exemplary embodiment, for providing the driver's command information 53, which represents the deceleration desired by the driver, the brake pressure controlled by the driver by means of the brake pedal 15 and the service brake valve 16 is sensed in one of the brake lines 17, 18, in other words by operating the brake pedal 15 the driver specifies his braking command, which is sent to the brake control unit 30 by means of a signal with the driver's command information 53, which qualitatively corresponds to the desired deceleration z-Soll.

Moreover, a characteristic field memory 37 in which maximum decelerations z-Max are stored as a function of the desired deceleration z-Soll is associated with the brake control unit 30. The brake control unit 30 is designed to determine a maximum deceleration z-Max as a function of the desired deceleration z-Soll that is currently specified by the driver.

Finally, the towing vehicle brake system 3 comprises an additional trailer pressure control valve 38, by means of which the brake control unit 30 can influence, as required, the trailer brake pressure P-A that is provided for the trailer vehicle 4 via the pneumatic coupling head 23.

Figure 2:
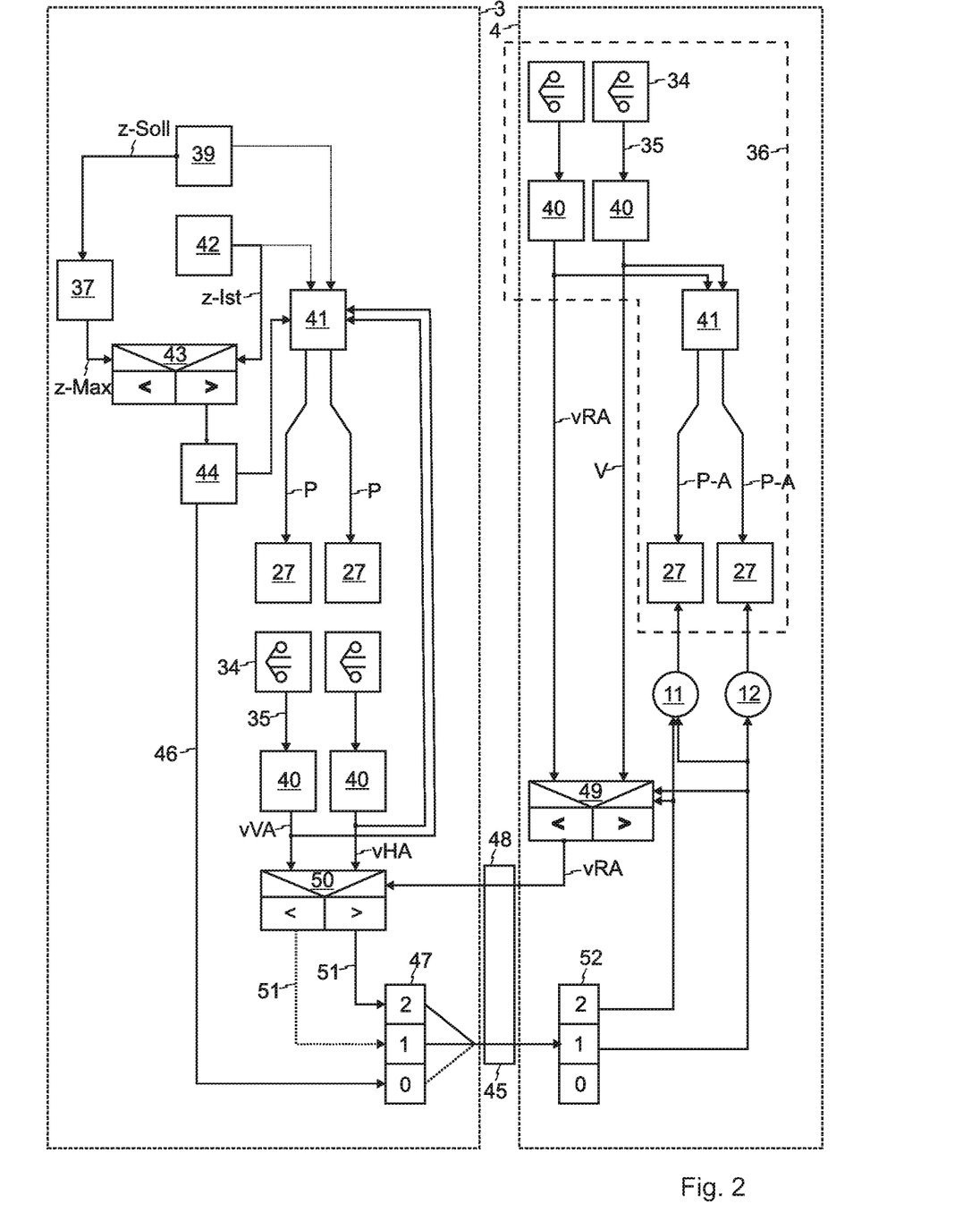
FIG. 2 shows a flowchart of an exemplary embodiment of a method for decelerating the vehicle combination of FIG. 1.

An exemplary embodiment of the operating mode of the combination of the towing vehicle brake system 3 and the trailer brake system 4 is described in detail below using FIG. 2. Both the brake control unit 30 of the towing vehicle brake system 3 and the brake electronics 31 of the trailer brake system 4 are configured for analysis 40 of the measurement signals 35 of the revolution rate sensors 34, which form the basis for a pressure determination 41. According to the pressure determination or determination of the brake pressure, corresponding control signals 28, 29 are produced for the relevant pressure control valves 27 in order to adjust the brake pressure P, P-A in the respective commercial vehicle as required. During the analysis 40, a slip variable value v, v-RA, v-VA, v-HA is determined in each case that represents the slip of the respective vehicle axle. In this case, the slip variable values are each determined in the same dimension, so that the slip variable values of different axles can be compared. In the exemplary embodiment shown, the respective axle speeds are determined as slip variable values.

The brake control unit 30 of the towing vehicle brake system reads the characteristic field memory 37 as a function of the desired deceleration z-Soll that is currently specified by the driver and thus determines a maximum deceleration z-Max using the feeling curves stored in the characteristic field memory 37. Furthermore, the brake control unit 30 is designed for detecting 42 a current vehicle deceleration actual value z-Ist. The brake control unit 30 compares 43 the vehicle deceleration actual value z-Ist and the determined maximum deceleration z-Max. In the case in which the vehicle deceleration actual value z-Ist reaches or exceeds the maximum deceleration z-Max, limiting 44 the brake pressure is carried out. The decision about limiting 44 the brake pressure is taken directly in the pressure determination step 41, wherein for example the brake control unit 30 closes individual or all inlet valves 32 of the pressure control valves 27 of the towing vehicle brake system 3 by producing suitable control signals 28, 29.

In the case in which limiting 44 the brake pressure is carried out, the brake control unit 30 provides the towing vehicle brake system 3 with an information signal 45 for the respective brake electronics 31 of a trailer brake system 4 of each trailer vehicle 6, which represents limiting status information 46. The provision 47 of the information signal 45 is carried out via the communications connection 48 of the sub vehicles of the vehicle combination, for example a CAN connection. The brake electronics 31 of the trailer brake system 4 are designed for receiving 52 the information signal 45, so that the brake electronics 31 detect the presence of an overbraking situation based on the maximum deceleration z-Max that is determined by means of feeling curves.

In such a case in which the current vehicle deceleration actual value z-Ist reaches or exceeds the determined maximum deceleration z-Max, a comparison 49 of the slip variable value v, vRA of the trailer axles 11, 12 determined by the brake electronics 31 is carried out in the brake electronics 31. Based on the comparison 49, the slip variable values of all trailer axles 11, 12, the brake electronics closes the inlet valves 32 of the respective pressure control valves 27 on the trailer axle 12 with the higher slip compared to the control axle 11 with the currently smallest slip. In exemplary embodiments with more than two trailer axles, using the comparison 49 of the slip variable values v, vRA of all trailer axles 11, 12, the inlet valves are closed on all the trailer axles 12 with the higher slips compared to the control axle 11 with the smallest slip.

The slip variable value vRA of the trailer axle determined as the control axle 11 with the currently smallest slip compared to all the other trailer axles 12 is communicated to the towing vehicle brake system 3 via the communications connection 48 (CAN) of the brake control unit 30. The brake control unit 30 of the towing vehicle brake system 3 determines a slip variable value vVA for the front axle 8 and a slip variable value vHA for the rear axle 9 of the towing vehicle 5, which are compared with the slip variable value vRA of the control axle 11 communicated by the brake electronics 31 of the trailer vehicle 6. In the case in which the greatest slip is determined for the control axle 11 of the trailer vehicle 6 in the vehicle comparison 50, this is communicated to the brake electronics 31 by means of an information signal 45 and the inlet valves 32 of the pressure control valves 27 on the control axle 11 of the trailer vehicle 6 are also closed.

When taking into account using the axle speeds as slip variable values for example, the situation arises that all inlet valves in the trailer vehicle are closed if the axle speed of the control axle 11 (front axle) of the trailer vehicle 6 is less than the lower axle speed of the speeds of the front axle 8 and the rear axle 9 of the towing vehicle 5.

Depending on the vehicle comparison 50 of the slip variable values vVA, vHA, vRA, the brake electronics 31 of the trailer brake system 4 are provided with an information signal 45 with overbraking information 51 corresponding to the vehicle comparison 50. In the case in which the corresponding slip variable value vRA shows that the control axle 11 with its inlet valves open has a smaller slip, or a higher speed than at least one of the axles 8, 9 of the towing vehicle 5, the inlet valves on the control axle 11 remain open and the inlet valves of the respective pressure control valves are closed only on the other trailer axles. This situation is represented by a first braking status 1 in the provision 47 of the information signal 45.

The second braking status 2 is communicated to the brake electronics 31 of the trailer brake system by means of a corresponding information signal 45 if in the vehicle comparison 50 of all the slip variable values the control axle proves to be the axle of the compared axles with the currently largest slip, i.e. it is currently the most overbraked one among all the axles being considered. This situation occurs in the comparison of the axle speeds as the slip variable values if the control axle 11 has the lowest axle speed vVA, vHA, vRA of all the compared axles 8, 9, 11. In this case, after receiving an information signal 45 with the second braking status 2, the brake electronics 31 causes the closing of all the inlet valves, i.e. including the inlet valves of the trailer axle that was considered to be the control axle 11 up to that time.

As long as vehicle deceleration actual values z-Ist remain below the maximum deceleration z-Max specified as the threshold for the intervention of limiting 44, the brake electronics 31 of the trailer brake system 4 of the trailer vehicle 6 are provided with a normal braking status 0 by the brake control unit 30 of the towing vehicle brake system 3 of the towing vehicle 5. This can be carried out actively by transmitting a corresponding information signal 45 with that braking status or merely by the absence of an information signal 45. In this case, an information signal 45 with the first braking status 1 or the second braking status 2 communicates the limiting status information 46 at the same time, i.e. that limiting 44 of the brake pressure P in the towing vehicle brake system 3 has been carried out.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST 0. normal braking status
1. braking status
2. braking status
3. towing vehicle brake system
4. trailer brake system
5. towing vehicle
6. trailer vehicle
7. vehicle combination
8. front axle
9. rear axle
10. wheel
11. control axle
12. trailer axle
13. wheel brake
14. brake cylinders
15. brake pedal
16. service brake valve
17. brake line
18. brake line
19. pressure medium reservoir
20. pressure medium reservoir
21. first brake circuit
22. second brake circuit
23. coupling head
24. trailer coupling valve
25. pressure medium reservoir
26. trailer brake circuit
27. pressure control valve
28. control signal
29. control signal
30. brake control unit
31. brake electronics
32. inlet valve
33. outlet valve
34. revolution rate sensor
35. measurement signal
36. anti-lock brake system
37. characteristic field memory
38. trailer pressure control valve 39. brake signal transmitter
40. analysis
41. pressure determination
42. detecting
43. comparison
44. limiting
45. information signal
46. limiting status information
47. provision
48. communications connection (CAN)
49. comparison
50. vehicle comparison
51. overbraking information
52. receiving
53. driver's command information
P brake pressure
P-A trailer brake pressure
v slip variable value (trailer axle)
vHA slip variable value (rear axle)
vRA slip variable value (control axle)
vVA slip variable value (front axle)
z-Ist vehicle deceleration actual value
z-Max maximum deceleration
z-Soll desired deceleration

The invention claimed is:

1. A method for decelerating a vehicle combination including a towing vehicle having a towing vehicle brake system and at least one trailer vehicle having a trailer brake system with an anti-lock brake system, the method comprising:
    applying, by the towing vehicle brake system, a brake pressure to pneumatically operable wheel brakes of the towing vehicle according to a desired deceleration specified by a driver; and
    providing, by the towing vehicle brake system, a trailer brake pressure for the trailer brake system of the at least one trailer vehicle,
    wherein an electronic brake control unit of the towing vehicle brake system: detects a current actual vehicle deceleration value continuously compares the current actual vehicle deceleration actual value with a maximum deceleration, and, when the current actual vehicle deceleration value reaches or exceeds the maximum deceleration, limits the brake pressure and provides an information signal for respective brake electronics of the at least one trailer vehicle that represents at least one item of limiting status information, and
    wherein the respective brake electronics of the trailer brake system of the at least one trailer vehicle:
    detects measurement signals of revolution rate sensors of wheels of the trailer vehicle,
    applies the trailer brake pressure to the wheel brakes of the trailer vehicle depending on the measurement signals by actuating pressure control valves,
    receives the information signal, and, upon detecting limiting of the brake pressure P in the towing vehicle, determines for each trailer axle a dynamic slip variable value representing a slip using the detected measurement signals, and
    compares slip variable values of all trailer axles with each other and closes inlet valves of respective pressure control valves at least at those trailer axles which have the higher slips compared to a control axle with a currently smallest slip.

2. The method as claimed in claim 1, wherein the maximum deceleration is determined as a function of the desired deceleration that is specified by the driver.

3. The method as claimed in claim 1, wherein the dynamic slip variable value of the control axle of the trailer vehicle is compared with slip variable values of the axles of the towing vehicle and in the case in which the largest slip is determined for the control axle in the vehicle comparison, the inlet valves of the pressure control valves are also closed on the control axle.

4. The method as claimed in claim 3, wherein the slip variable value of the control axle of the trailer vehicle is communicated to the brake control unit of the towing vehicle brake system and the brake control unit provides an information signal with overbraking information corresponding to the vehicle comparison.

5. The method as claimed in claim 3, wherein a speed of the relevant axle is determined and analyzed as the slip variable value.

6. A combination of pneumatic brake systems of vehicles of a vehicle combination, the combination of pneumatic brake systems comprising:
    a towing vehicle brake system of a towing vehicle of the vehicle combination; and
    a trailer brake system with an anti-lock brake system of a trailer vehicle of the vehicle combination,
    wherein the towing vehicle brake system comprises pneumatically operable wheel brakes of the towing vehicle and a brake control unit that is connected to pressure control valves of the pneumatically operable wheel brakes of the towing vehicle, the towing vehicle brake system being configured to:
        detect a current actual vehicle deceleration value and continuously compare the current actual vehicle deceleration with a maximum deceleration, and
        when the current actual vehicle deceleration reaches or exceeds the maximum deceleration, limit the brake pressure and provide an information signal that represents at least one item of limiting status information for the respective brake electronics of each trailer vehicle), and
    wherein the trailer brake system comprises brake electronics and revolution rate sensors associated with respective wheels of the trailer vehicle and a wheel brake on each wheel of the trailer vehicle that can be operated pneumatically by the brake electronics by pressure control valves, wherein the brake electronics are connected to the brake control unit of the towing vehicle for signal transmission via a communications connection, the trailer brake system being configured to:
        apply a trailer brake pressure to the wheel brakes on each wheel of the trailer vehicle by actuating the pressure control valves depending on measurement signals of the revolution rate sensors,
        receive the information signal and determine a dynamic slip variable value representing a slip on detecting limiting of the brake pressure in the towing vehicle using the measurement signals of the revolution rate sensors of the trailer brake system for each trailer axle,
        compare the slip variable values of all trailer axles with each other and close the inlet valves of the respective pressure control valves of at least one of those trailer axles with the higher slips compared to a control axle with the currently smallest slip.

7. The combination of pneumatic brake systems as claimed in claim 6, wherein a characteristic field memory in which maximum decelerations to be specified as a function of the desired deceleration are stored is associated with the brake control unit of the towing vehicle and the brake control unit is designed to determine a maximum deceleration as a function of a desired deceleration that is currently specified by the driver.

8. The combination of pneumatic brake systems as claimed in claim 6, wherein the brake control unit is designed for receiving slip variable values of the trailer axles via the communications connection.

* * * * *